US012781833B2

(12) United States Patent
Wasser et al.

(10) Patent No.: US 12,781,833 B2
(45) Date of Patent: Nov. 3, 2026

(54) PLANETARY GEAR ASSEMBLY

(71) Applicant: AUMA Riester GmbH & Co. KG, Müllheim (DE)

(72) Inventors: Tobias Wasser, Freiburg (DE); Benjamin Hofmann, Heitersheim (DE); Anna Wirtz, Wenden (DE)

(73) Assignee: AUMA RIESTER GMBH & CO. KG, Muellheim (DE)

( * ) Notice: Subject to any disclaimer, the term of this patent is extended or adjusted under 35 U.S.C. 154(b) by 0 days.

(21) Appl. No.: 18/997,225

(22) PCT Filed: Jul. 13, 2023

(86) PCT No.: PCT/EP2023/069461
§ 371 (c)(1),
(2) Date: Jan. 21, 2025

(87) PCT Pub. No.: WO2024/017755
PCT Pub. Date: Jan. 25, 2024

(65) Prior Publication Data

US 2026/0036187 A1 Feb. 5, 2026

(30) Foreign Application Priority Data

Jul. 22, 2022 (DE) ......................... 102022118426.9

(51) Int. Cl.
*F16H 1/46* (2006.01)
*F16H 19/00* (2006.01)
*F16H 57/08* (2006.01)

(52) U.S. Cl.
CPC ............. *F16H 1/46* (2013.01); *F16H 19/001* (2013.01); *F16H 57/082* (2013.01)

(58) Field of Classification Search
CPC ......... F16H 1/46; F16H 57/082; F16H 1/2863
See application file for complete search history.

(56) References Cited

U.S. PATENT DOCUMENTS

| | | | | |
|---|---|---|---|---|
| 9,512,900 | B2 * | 12/2016 | Hederstad | F16H 1/2836 |
| 2005/0067907 | A1 | 3/2005 | Takeuchi | |
| 2020/0088268 | A1 * | 3/2020 | Klassen | F16H 55/08 |
| 2020/0124163 | A1 | 4/2020 | Klassen | |

FOREIGN PATENT DOCUMENTS

| | | | | |
|---|---|---|---|---|
| CN | 110741181 | A * | 1/2020 | F16H 55/18 |
| DE | 19649422 | A1 | 6/1998 | |
| DE | 102016202753 | A1 | 8/2017 | |
| DE | 102016113117 | A1 | 1/2018 | |
| DE | 102021134209 | A1 | 6/2022 | |
| EP | 2479458 | B1 | 5/2013 | |
| EP | 4006379 | A1 | 6/2022 | |
| JP | 2018066468 | A | 4/2018 | |
| WO | 2012013594 | A2 | 2/2012 | |
| WO | 2016165706 | A1 | 10/2016 | |

OTHER PUBLICATIONS

CN_110741181_A (Year: 2020).*

* cited by examiner

*Primary Examiner* — Derek D Knight
(74) *Attorney, Agent, or Firm* — Volpe Koenig

(57) ABSTRACT

A planetary gear (5) including a sun gear (9), a ring gear (6) and a planet carrier (7) having a number, preferably three, planet gears (8). The axial position of two meshing gear parts in relation to each other is defined by magnetic bias.

14 Claims, 3 Drawing Sheets

PLANETARY GEAR ASSEMBLY

CROSS-REFERENCE TO RELATED APPLICATIONS

This application is a 371 National Phase Application of PCT/EP2023/069461, filed Jul. 13, 2023, which claims priority from German Patent Application No. 10 2022 118 426.9, filed Jul. 22, 2022, both of which are incorporated herein by reference as if fully set forth.

TECHNICAL FIELD

The invention relates to a planetary gear assembly comprising at least two planetary gear stages, each with a sun gear, a ring gear and a planet carrier having multiple, preferably three, planet gears.

BACKGROUND

Such planetary gear assemblies are well known and are used, for example, in actuators that are suitable for operating fittings or valves.

In order to achieve a desired transmission ratio, it is common to manufacture planetary gear assemblies with several gear stages in a stacked arrangement, wherein each gear stage is designed as a planetary gear, wherein such a gear stage is also called a planetary gear stage in the following.

Since planetary gears are compact and versatile, it is also common to manufacture planetary gears at low cost, wherein certain manufacturing tolerances are accepted.

In such cheaply manufactured planetary gears, manufacturing tolerances can lead to increased axial play between the individual meshing parts, i.e. gears.

If this axial play between the individual moving parts becomes too large, undefined operating states can be assumed, for example only partial overlapping of meshing parts. Among other things, this leads to increased wear and should be avoided. This axial play of the individual planetary gears can increase, particularly in multi-stage planetary gear assemblies.

For this purpose, it is common practice to dimension the meshing parts axially so large that partial axial overlap cannot occur and complete axial overlap is always maintained. However, this leads to large dimensions and thus to undesirably increased costs.

SUMMARY

It is the object of the invention to minimize axial play between the gears of a compact planetary gear while still allowing cost-effective production.

This object is solved by a planetary gear assembly having one or more of the features disclosed herein.

The planetary gear assembly according to the invention, in particular as a planetary gear, is thus characterized in particular in that the axial position of two meshing gear parts in relation to one another is defined by a magnetic bias, and in that at least the planet carrier of a first planetary gear stage and the planet carrier of a second planetary gear stage are axially braced against one another by the magnetic bias. In this way, the relative axial position between two meshing parts is clearly predetermined and defined. Axial partial overlap and thus undefined operating conditions and increased wear are practically eliminated. It is therefore also possible to build a compact planetary gear that is manufactured cost-effectively and therefore with tight tolerances.

The magnetic bias has the further advantage that the relative axial position is defined without contact. This results in neither friction nor wear.

It is irrelevant whether the two meshing gear parts, such as gears, are both movable or whether one of the gear parts is fixed, at least in the axial direction. For example, the ring gear in a planetary gear can be fixed. The axial position can now be defined between the ring gear and the planet carrier and/or between the planet carrier and the sun gear.

The axial position can be defined directly or indirectly between two meshing gears. For example, it is also possible for the axial position to be defined between gears that are not in mesh with each other, such as between the sun gear and ring gear. In this way, the axial position of the meshing gears is defined indirectly.

The planetary gear assembly can generally form a planetary gear, for example with or without a housing and/or other functional attachments and/or as a single-stage or multi-stage gear.

In one embodiment, the magnetic bias is defined in relation to a gear part connected to the housing, in particular one that is rotatably mounted. In this way, there is a fixed reference point for the axial position, which means that component tolerances have less influence on the relative and absolute positions of the individual gears.

In one embodiment, at least the planet carrier of a first gear stage and the planet carrier of a second gear stage are axially braced against each other by the magnetic bias. In this way, several gear stages can be axially aligned with each other, thus preventing axial play.

In one embodiment, the planetary gear has at least two permanent magnets which are arranged in such a way that identical magnetic poles are arranged opposite each other. The magnetic repulsion between the similar magnetic poles creates a force that precisely defines an axial position. A further advantage is that the repulsive force increases strongly with decreasing distance. Contact between the two permanent magnets is therefore practically impossible, so that the position is reliably maintained.

In one embodiment, a first permanent magnet is connected to the planet carrier. In this way, an axial position of the planet carrier and thus of the planetary gears can be defined. However, the first permanent magnet can also be connected to one of the other gears of the planetary gear.

In one embodiment, a second permanent magnet is arranged with a gear part, in particular one that is axially fixed, in particular outside the ring gear. In this way, it is possible to position different gear parts axially in relation to each other or between different gear stages.

In any case, the first and second permanent magnets are arranged in such a way that the same magnetic poles face each other and the permanent magnets repel each other.

The combination in which the first permanent magnet is connected to the planet carrier and the second permanent magnet is connected to a gear part that is fixed, in particular axially, is particularly advantageous, wherein the gear part can also be rotatable relative to the housing. In this way, a defined position of the planet carrier relative to a housing is ensured. Since, for example, the ring gear is also fixed to the housing, a defined axial position of the planet carrier, i.e. the planet gears, in relation to the ring gear is ensured.

The permanent magnets can be almost any shape and arranged in a suitable position.

In an advantageous embodiment, the permanent magnets are designed as ring magnets, each of which is arranged coaxially to the sun gear shaft. In this way, a simple arrangement is possible and the repulsive force of the permanent magnets acts in an axial direction to the sun gear shaft. This means that no tilting moment is generated by the magnetic force, which could possibly have negative effects on the gears.

In one embodiment, the gear has a receptacle in which both ring magnets are arranged. This receptacle ensures simple installation and a defined position of the magnets. This enables axial positioning of the gears.

In one embodiment, the planetary gear has at least two gear stages, wherein each gear stage is designed as a planetary gear and the axial position between the two gear stages is defined by the magnetic bias. This means that manufacturing tolerances can also be compensated for and axial play minimized when several planetary gears are joined axially.

In this way, for example, the axial position of a gear of a first gear stage in relation to a gear of a second gear stage can also be defined by a magnetic bias.

The invention further comprises a planetary gear assembly having at least two planetary gear stages, wherein each gear stage is designed as a planetary gear, wherein the two ring gears of the planetary gear stages are axially connected or connectable by a latching and/or a screw connection. In this way, a multi-stage planetary gear assembly can be composed of several simple planetary gears by plugging and/or screwing the individual planetary gears together in the axial direction. This enables simple production and easy assembly.

The individual planetary gears of the gear stages can preferably be the same, so that fewer different parts or components are also required. This can make production more cost-effective and also simplify assembly.

In one embodiment, the planet carrier of a first planetary gear stage has at least one latching tongue that can be deflected in the axial direction. A circumferential groove is arranged on the sun gear or the sun gear shaft of the second planetary gear stage and the latching tongue engages in the groove when the two planetary gear stages are connected to each other.

During the connection of the two planetary gear stages, the sun gear or the sun gear shaft deflects the latching tongue in an axial direction until the sun gear or the sun gear shaft fits through the opening of the latching tongue. As soon as the latching tongue reaches the groove during further axial insertion, the latching tongue engages in the groove and thus establishes the axial connection.

In one embodiment, a magnetic bias is formed between the planetary gear stages as described above. This allows, for example, the axial position of the groove to the latching tongue to be defined in such a way that there is no friction or contact during operation.

BRIEF DESCRIPTION OF THE DRAWINGS

The invention is explained in more detail below by means of an exemplary embodiment with reference to the accompanying drawings. The exemplary embodiment is for illustrative purposes only and is in no way restrictive of the invention, wherein.

DETAILED DESCRIPTION

Figure 1:
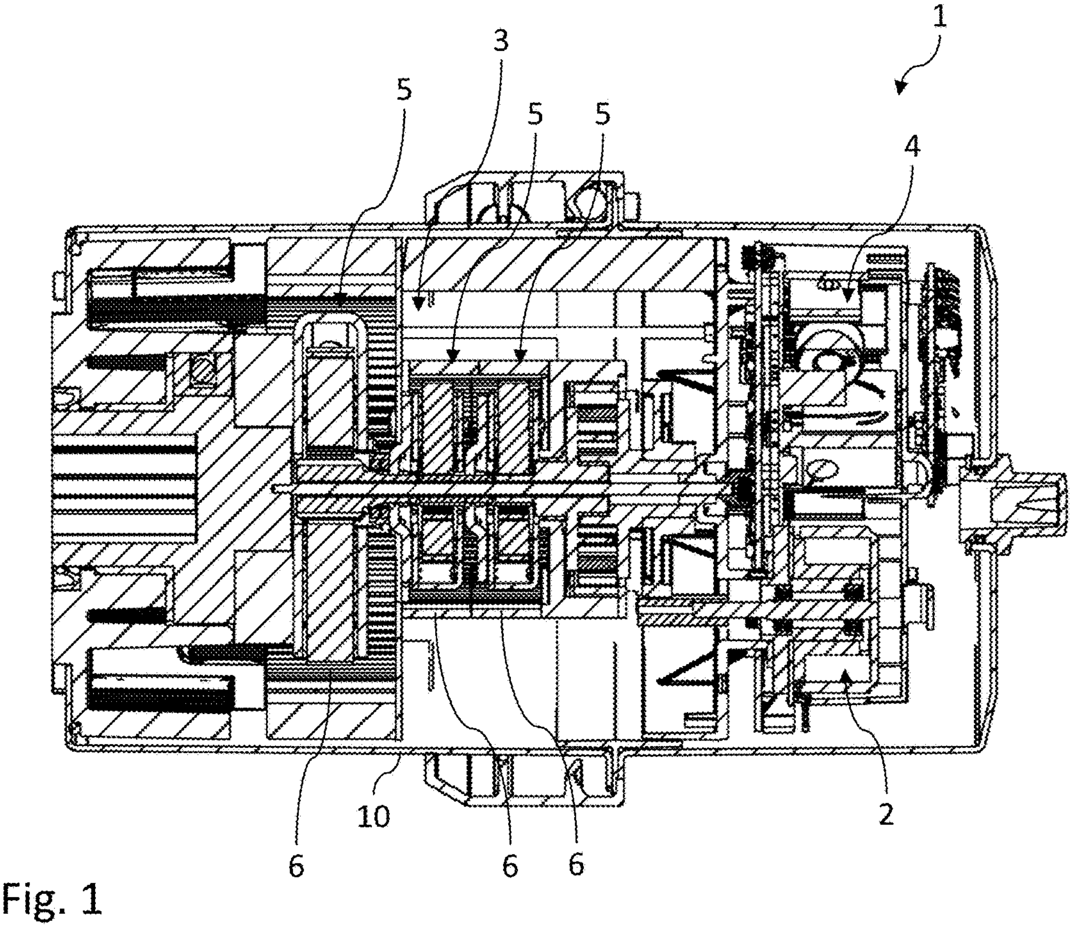
FIG. 1: shows a sectional view of an actuator with a multi-stage planetary gear assembly with magnetic axial bias.

FIG. 1 shows a sectional view of an actuator 1 with a drive motor 2, a planetary gear assembly 3, an electronic control unit 4 and a housing 10.

The drive motor 2 and the associated electronic control unit 4 are irrelevant to the invention, which is why these elements are not described further here. The invention is therefore in no way limited to the exemplary embodiment.

The planetary gear assembly 3 has three planetary gear stages 5, each of which is formed by a planetary gear. Each planetary gear 5 has a ring gear 6, a planet carrier 7 with three planet gears 8 and a sun gear 9. The ring gear 6 is connected to the housing 10 so that it cannot rotate. The sun gear 9 is the drive and the planet carrier 7 is the output of each planetary gear 5.

The individual planetary gears 5 are arranged one behind the other in an axial direction. The sun gears 9 are hollow bored and arranged on a signaling shaft 11.

The individual planetary gears 5 can be simple and inexpensively manufactured planetary gears. In order to compensate for any tolerances and axial play, the middle planetary gear 5 in the example has a magnetic axial bias. It is understood that another planetary gear or even more of the planetary gears could also be magnetically biased.

Figure 2:
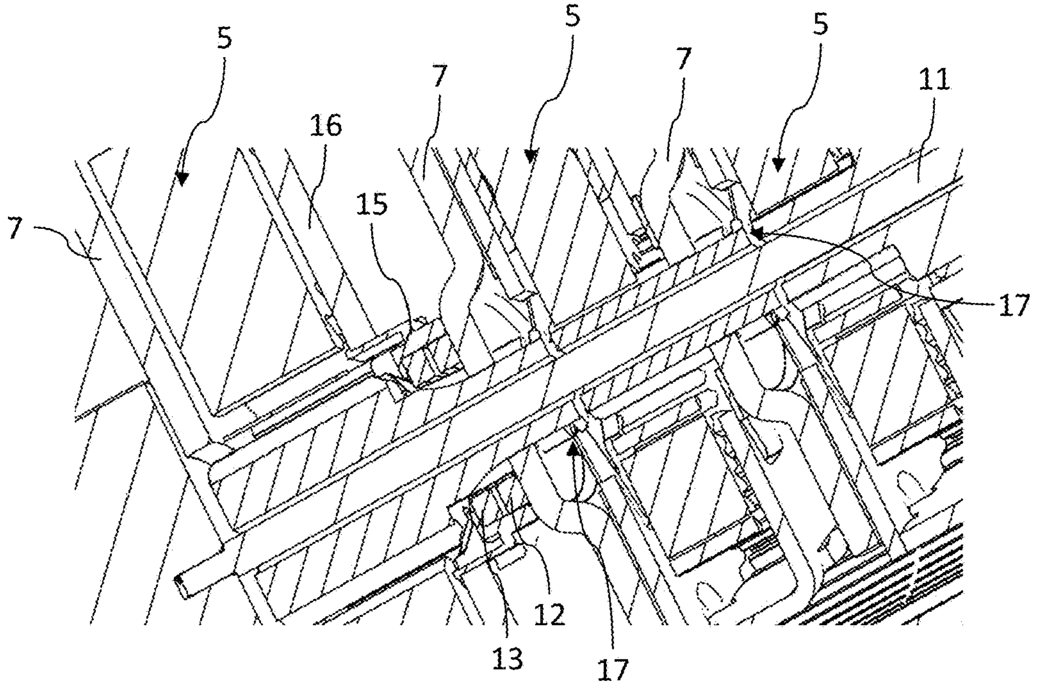
FIG. 2: shows a detail of a sectional view of the actuator of FIG. 1 in the region of the permanent magnets for axial bias.
Figure 3:
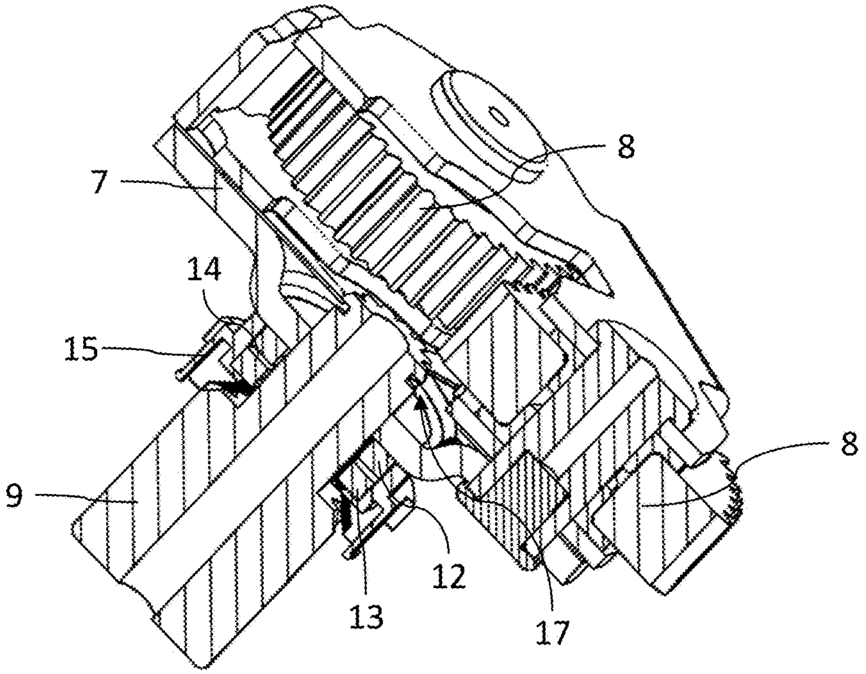
FIG. 3: shows a sectional oblique view of a detail of a planetary gear assembly in the region of the permanent magnets for axial bias.
Figure 4:
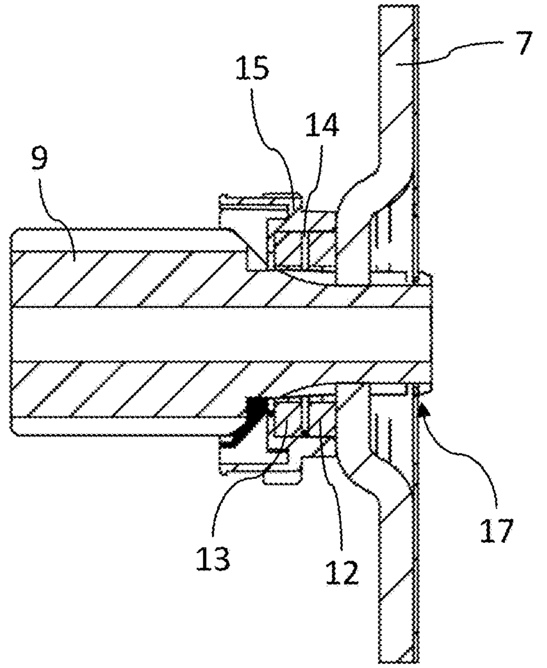
FIG. 4: shows a sectional view of a detail of a planetary gear assembly in the region of the permanent magnets for axial bias.

FIGS. 2 to 4 show a detail of this central planetary gear 5. A first permanent magnet 12 is connected here to the planet carrier 7 of the central planetary gear 5. The planet carrier 7 is non-rotatably connected to the sun gear 9 of the planetary gear 5 of the next gear stage.

In the example, the first permanent magnet 12 is designed as a ring magnet, which is arranged coaxially around this sun gear 9.

A second permanent magnet 13 is also designed as a ring magnet and is arranged coaxially around the sun gear 9. This second permanent magnet 13 is non-rotatably connected to a gear part 16. This gear part 16 is fixed in the axial direction relative to the housing 10, but is arranged rotatably within the housing 10. The two permanent magnets 12 and 13 are separated by an air gap 14, wherein magnetic poles of the same polarity face each other. The permanent magnets 12, 13 can, for example, be magnetized in an axial direction, wherein one end face is the north pole and the opposite end face is the south pole. In this way, the sun gear 9 together with the planet carrier 7 can be displaced in the axial direction by the magnetic force within the gear part 16.

The two permanent magnets 12, 13 run in a receptacle 15, which is made of plastic, for example. The receptacle 15 surrounds the permanent magnets 12, 13 on the outer circumference and protects them from environmental influences.

The opposing arrangement of identical magnetic poles creates a repulsive magnetic force in the axial direction, which defines an axial relative position between the planet carrier 7 in relation to the gear part 16. Since the ring gear 6 of the central planetary gear 5 is also connected to the housing 10 in a rotationally fixed manner, the axial position between the planet gears 8 and the ring gear 6 of the central planetary gear 5 is thus indirectly defined.

Figure 5:
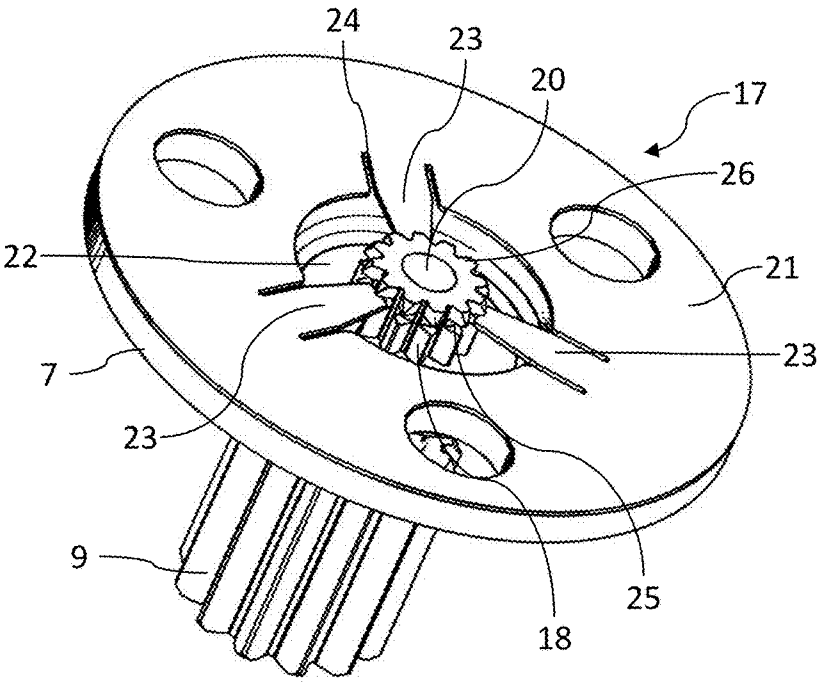
FIG. 5: shows an oblique view of a latching connection.
Figure 6:
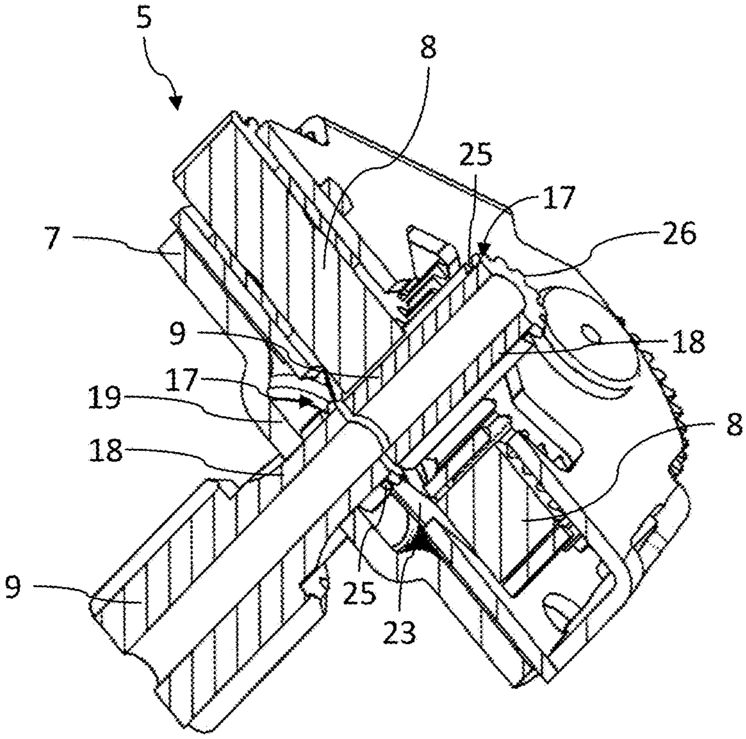
FIG. 6: shows a sectional oblique view of a planetary gear assembly with a latching connection.

In the example, parts of the individual planetary gears 5 are each axially connected to each other by a latching connection 17. FIGS. 5 and 6 each show such a latching connection.

In the example, the sun gear 9 is formed in one piece with a sun gear shaft 18, wherein the sun gear shaft 18 is extended on one side in the axial direction beyond the sun gear 9. The sun gear shaft 18 has an axial axle bore 20 to accommodate a signaling shaft 11. In the example shown in FIG. 5, the sun gear 9 has a larger diameter than the sun gear shaft 18.

As can be seen in FIG. 6, the sun gear 9 can also have the same diameter as the sun gear shaft 18.

In the example, the planet carrier 7 is non-rotatably connected to the sun gear shaft 18. The sun gear 9 is part of the planetary gear of a subsequent gear stage. In the example, the planet carrier 7 is disk-shaped. The free end of the sun gear shaft 18, i.e. the axial extension of the sun gear shaft 18, protrudes beyond the planet carrier 7 in the axial direction.

In the region of the connection to the sun gear shaft 18, the planet carrier has a cup-shaped depression 19. In the example, the sun gear shaft 18 has a toothing 26, which makes it easy to create a torsionally rigid connection with the planet carrier 7. For this purpose, the depression 19 has a corresponding toothing. At the same time, this makes it possible to push the planet carrier 7 onto the sun gear shaft 18 in the axial direction.

A disk 21 is also arranged on the planet carrier 7, which has a coaxial opening 22. The diameter of the opening 22 is in any case larger than the diameter of the sun gear shaft 18. The free end of the sun gear shaft 18 is guided through this opening 22 and projects beyond this disk 21 in the axial direction. Three latching tongues 23 are arranged at the opening 22, evenly spaced around the circumference. The latching tongues 23 are radially aligned and designed as spring tongues. In the example, the latching tongues 23 are extended by slots 24 in the disk 21. Alternatively, the opening could also have a larger diameter in order to extend the latching tongues. In the example, the latching tongues 23 are aligned radially to the opening, although a different alignment is also possible.

The sun gear shaft 18 has a circumferential latching groove 25 into which the latching tongues 23 engage when two such planetary gears are connected to each other.

When the planet carrier 7 is fitted onto the sun gear shaft 18, the latching tongues 23 are deflected axially by the free end of the sun gear shaft 18 to such an extent that the sun gear shaft 18 can be moved along the latching tongues 23. As soon as the latching tongues 23 reach the latching groove 25, they engage there.

Preferably, the free end of the sun gear shaft 18 has a chamfer or rounding that can facilitate insertion.

The latching connection 17 makes it easy to connect several planetary gears axially with each other to create a multi-stage planetary gear. The individual sun gear shafts 18 and the planet carriers 7 of the individual gear stages can be pushed onto the signaling shaft 11 one after the other, wherein they are connected to each other in the axial direction by the latching connection 17.

Although the magnetic bias and the latching connection are shown combined in the exemplary embodiment, both concepts can also be used and applied on their own. It is therefore easily possible, for example, to use the magnetic bias in a single-stage planetary gear. It is also possible to use an axial latching connection without magnetic bias.

LIST OF REFERENCE SIGNS

1 Actuator
2 Drive motor
3 Planetary gear assembly
4 Electronic control unit
5 Planetary gear, gear stage, planetary gear stage
6 Ring gear
7 Planet carrier
8 Planet gear
9 Sun gear
10 Housing
11 Axle, signaling shaft
12 First permanent magnet
13 Second permanent magnet
14 Air gap
15 Receptacle
16 Housing part, gear part
17 Latching connection
18 Sun gear shaft
19 Depression
20 Axle bore
21 Disk
22 Opening
23 Latching tongue
24 Slot
25 Latching groove

The invention claimed is:

1. A planetary gear assembly (3), comprising:
at least two planetary gear stages (5), each with a sun gear (9), a ring gear (6) and a planet carrier (7) having multiple planet gears (8) connected thereto;
an axial position of two meshing ones of the gear parts in relation to one another is defined by a magnetic bias; and
at least the planet carrier (7) of a first one of the at least two planetary gear stages (5) and the planet carrier (7) of a second one of the at least two planetary gear stages (5) are axially braced against one another by the magnetic bias.

2. The planetary gear assembly (3) according to claim 1, wherein the magnetic bias is defined in relation to a gear part (16) which is connected to the housing (10).

3. The planetary gear assembly (3) according to claim 1, further comprising at least two permanent magnets (12, 13) which are arranged such that identical magnetic poles are arranged opposite each other that form the magnetic bias.

4. The planetary gear assembly (3) according to claim 3, wherein at least one of a) a first one of the permanent magnets (12) is connected to the planet carrier (7) or b) a second one of the permanent magnets (13) is connected to a gear part (16).

5. The planetary gear assembly (3) according to claim 3, wherein the permanent magnets (12, 13) comprise ring magnets which are each arranged coaxially to a sun gear shaft (18) of the sun gear (9).

6. The planetary gear assembly (3) according to claim 5, further comprising a receptacle (15) in which both of the ring magnets (12, 13) are arranged.

7. The planetary gear assembly (3) according to claim 1, further comprising a latching connection (17) by which the at least two planetary gear stages (5) are axially connected or connectable together.

8. The planetary gear assembly (3) according to claim 7, wherein the latching connection comprises the planet carrier (7) of a first one of the at least two planetary gear stages (5) having at least one latching tongue (23) which is deflectable in the axial direction, and a circumferential latching groove (25) is arranged on the sun gear (9) or the sun gear shaft (18) of a second one of the at least two planetary gear stages (5), and the latching tongue (23) engages in the latching groove (25) when the two planetary gear stages are connected to one another.

9. The planetary gear assembly (3) according to claim 8, wherein the latching tongue (23) is arranged at a coaxial opening (22) through which the sun gear (9) or the sun gear shaft (18) is adapted to pass or is passed.

10. The planetary gear assembly (3) according to claim 9, wherein there are three of the latching tongues (23) that are arranged at the opening (22).

11. An actuator (1), comprising the planetary gear assembly (3) according to claim 1.

12. The planetary gear assembly (3) according to claim 2, wherein the gear part (16) is rotatably mounted.

13. The planetary gear assembly (3) according to claim 4, wherein the second one of the permanent magnets (13) is connected to the gear part (16) outside the ring gear (6).

14. The planetary gear assembly (3) according to claim 10, wherein the latching tongues (23) are evenly distributed around a circumference of the opening (22).

* * * * *